United States Patent
Farley et al.

(10) Patent No.: US 10,299,437 B2
(45) Date of Patent: May 28, 2019

(54) HEADER FOR AN AGRICULTURAL VEHICLE WITH DEFORMABLE SUPPORTS

(71) Applicant: CNH Industrial America LLC, New Holland, PA (US)

(72) Inventors: Herbert M. Farley, Elizabethtown, PA (US); Benjamin Kemmerer, New Holland, PA (US); David M. DeChristopher, Ephrata, PA (US); Blaine R. Noll, Fleetwood, PA (US); Bart M. A. Missotten, Winksele (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/651,424

(22) Filed: Jul. 17, 2017

(65) Prior Publication Data
US 2019/0014722 A1    Jan. 17, 2019

(51) Int. Cl.
| | | |
|---|---|---|
| *A01D 75/18* | (2006.01) | |
| *A01D 41/14* | (2006.01) | |
| *A01D 34/04* | (2006.01) | |
| *A01D 61/02* | (2006.01) | |

(52) U.S. Cl.
CPC .......... *A01D 75/182* (2013.01); *A01D 34/04* (2013.01); *A01D 41/14* (2013.01); *A01D 61/02* (2013.01)

(58) Field of Classification Search
CPC .... A01D 41/14; A01D 75/185; A01D 34/661; A01D 75/182; A01D 34/04; A01D 61/02; A01B 73/02
See application file for complete search history.

(56) References Cited

U.S. PATENT DOCUMENTS

| | | | | |
|---|---|---|---|---|
| 3,670,913 A | | 6/1972 | Reaves | |
| 3,679,003 A | * | 7/1972 | Wadsworth | A01D 34/84 172/15 |
| 3,760,571 A | * | 9/1973 | Foster | A01D 34/13 56/298 |

(Continued)

FOREIGN PATENT DOCUMENTS

| | | | | |
|---|---|---|---|---|
| DE | 102009034933 A1 | * | 2/2011 | ............ A01D 78/06 |
| DE | 102013214596 A1 | * | 1/2015 | ............ A01D 41/14 |
| GB | 185679 | | 9/1992 | |

OTHER PUBLICATIONS

Notification of Transmittal of the International Search Report and the Written Opinion of the International Searching Authority, or the Declaration dated Sep. 20, 2018 for International Application No. PCT/US2018/042513 (12 pages).

(Continued)

*Primary Examiner* — Arpad Fabian-Kovacs
(74) *Attorney, Agent, or Firm* — Peter K. Zacharias; Patrick M. Sheldrake (57) ABSTRACT

An agricultural vehicle includes a chassis and a header carried by the chassis. The header includes: a frame coupled to the chassis; a cutter bar assembly connected to the frame; a plurality of linkage arms connected to the cutter bar assembly; and a plurality of sacrificial connectors each connected to a respective one of the linkage arms and the frame, each of the plurality of sacrificial connectors including at least one sacrificial region configured to deform or shatter upon an overload force acting on the respectively connected linkage arm.

20 Claims, 7 Drawing Sheets

(56) References Cited

U.S. PATENT DOCUMENTS

| | | | |
|---|---|---|---|
| 3,955,344 A * | 5/1976 | Sorensen | A01D 34/07 56/10.4 |
| 4,023,333 A | 5/1977 | Anderson | |
| 4,091,602 A | 5/1978 | Williams et al. | |
| 4,573,308 A | 3/1986 | Ehrecke et al. | |
| 4,660,360 A | 4/1987 | Hardesty et al. | |
| 4,700,534 A | 10/1987 | Reilly | |
| 4,899,523 A * | 2/1990 | Frumholtz | A01D 34/661 56/13.6 |
| 4,974,399 A * | 12/1990 | Haberkorn | A01B 73/02 56/15.2 |
| 5,044,636 A | 9/1991 | Rosenberg | |
| 6,675,563 B1 * | 1/2004 | Ehrhart | A01D 75/182 56/10.3 |
| 6,675,568 B2 * | 1/2004 | Patterson | A01D 41/14 56/208 |
| 7,937,921 B2 | 5/2011 | Lohrentz | |
| 7,992,372 B1 * | 8/2011 | Coers | A01D 41/14 56/153 |
| 9,220,199 B2 | 12/2015 | Holler et al. | |
| 2010/0043368 A1 * | 2/2010 | Sloan | A01D 41/141 56/10.2 E |
| 2010/0083629 A1 * | 4/2010 | Klotzbach | A01D 41/14 56/320.1 |
| 2013/0105282 A1 | 5/2013 | Hoffman et al. | |
| 2013/0160417 A1 * | 6/2013 | Huseman | A01D 41/14 56/181 |
| 2015/0101300 A1 | 4/2015 | Pierson | |

OTHER PUBLICATIONS

English translation of the specification of DE 102013214596 cited in the attached International Search Report and in the Office Action dated Aug. 28, 2018. The translation was provided by the European Patent Office and accessed on Nov. 15, 2018 (8 pages).

* cited by examiner

HEADER FOR AN AGRICULTURAL VEHICLE WITH DEFORMABLE SUPPORTS

FIELD OF THE INVENTION

The present invention relates to agricultural vehicles, and, more particularly, to agricultural vehicles which include headers with cutter bar assemblies.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

To remove crop material from the field, the header of the combine harvester may be equipped with a cutter bar assembly having many sharp cutting elements that reciprocate sidewardly, relative to a forward direction of travel, to sever the crop material from the field before entering the feeder housing. The header may include a rotating reel with tines or the like to sweep crop material toward the cutting elements.

A conveyance system can be carried rearwardly of the cutting elements. Two different conveyance systems are widely used to transport cut crop material toward a center of the header before proceeding to the feeder housing. The first type of conveyance system utilizes a pair of cross augers which counter-rotate to convey crop material from sides of the header toward the center. The other type of conveyance system utilizes a rotating belt, which can be referred to as a draper belt, to convey material from sides of the header toward the center. When a draper belt is used to convey crop material toward the center of the header, the header can be referred to as a "draper header."

A draper header is typically used to harvest fluffy or bushy crop material such as soy beans or canola. Many draper headers include two lateral draper belts that convey the crop material longitudinally inward and a center feed belt that conveys the crop material into the feeder housing. Each draper belt may be wrapped around rollers, for example various combinations of drive rollers and idler rollers. The draper belts may include cleats extending transversely across the full width of the header, which contact the crop material to help facilitate its transportation into the feeder housing.

In many draper header configurations, the cutter bar assembly is supported by a frame of the draper header which also supports an interior of the draper belt which does not generally contact crop material. Since cut crop material tends to fall on a top of the draper belt during harvesting, supporting the bottom of the draper belt with the frame helps the draper belt keep its shape during harvesting. In many draper head configurations, the frame also connects the cutter bar assembly and associated cutting elements to the chassis of the combine.

One particular problem of known draper headers occurs when the cutter bar assembly collides with a relatively immobile object. When the collision occurs, the frame of the header can be damaged due to force transmission through the frame. In many cases, the damage that occurs to the frame is not easily and/or inexpensively repaired; in some cases, the damage to the frame is so extensive that the entire header must be replaced.

To limit damage to the frame that may occur when the cutter bar contacts an immobile object, some header constructions incorporate springs which compress during impact. While the springs may be effective to limit frame damage, the tendency of the springs to compress and rebound during normal crop harvesting operations can cause a large amount of movement by the frame, and especially the cutter bar, which detrimentally affects the consistency of the cut by the cutting elements. Further, it is difficult to adequately support the cutter bar when using springs to limit damage since the springs alone cannot adequately support the cutter bar against the force of gravity if the deformation and rebounding of the springs tends to occur parallel to the travel direction of the combine.

What is needed in the art is a header which is less prone to structural damage than known constructions while still allowing for a consistent cut during harvesting.

SUMMARY OF THE INVENTION

In accordance with one exemplary embodiment of the present invention, there is provided a header which includes a sacrificial connector having at least one sacrificial region configured to deform or shatter upon an overload force acting on a respectively connected linkage arm which is connected to a cutter bar assembly of the header.

In accordance with another exemplary embodiment of the present invention, there is provided an agricultural vehicle including a chassis and a header carried by the chassis. The header includes: a frame coupled to the chassis; a cutter bar assembly connected to the frame; a plurality of linkage arms connected to the cutter bar assembly; and a plurality of sacrificial connectors each connected to a respective one of the linkage arms and the frame, each of the plurality of sacrificial connectors including at least one sacrificial region configured to deform or shatter upon an overload force acting on the respectively connected linkage arm.

In accordance with yet another exemplary embodiment of the present invention, there is provided a header including: a frame; a cutter bar assembly connected to the frame; a plurality of linkage arms connected to the cutter bar assembly; and a plurality of sacrificial connectors each connected to a respective one of the linkage arms and the frame, each of the plurality of sacrificial connectors including at least one sacrificial region configured to deform or shatter upon an overload force acting on the respectively connected linkage arm.

One possible advantage of the exemplary header described herein is that the sacrificial connectors can allow "crumpling" of the header upon the overload force acting on the linkage arm, limiting damage that occurs to structural components of the header.

Another possible advantage of the exemplary header described herein that the sacrificial connector shattering can also limit damage that occurs to structural components of the header.

Yet another possible advantage of the exemplary header described herein is that the sacrificial connectors can be relatively cheap and easy to replace so a collision of the header with a relatively stationary object may not be costly or result in a relatively long period of downtime.

BRIEF DESCRIPTION OF THE DRAWINGS

The above-mentioned and other features and possible advantages, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate several exemplary embodiments of the invention and such exemplifications are not to be construed as limiting the scope of the invention in any manner.

DETAILED DESCRIPTION OF THE INVENTION

Figure 1:
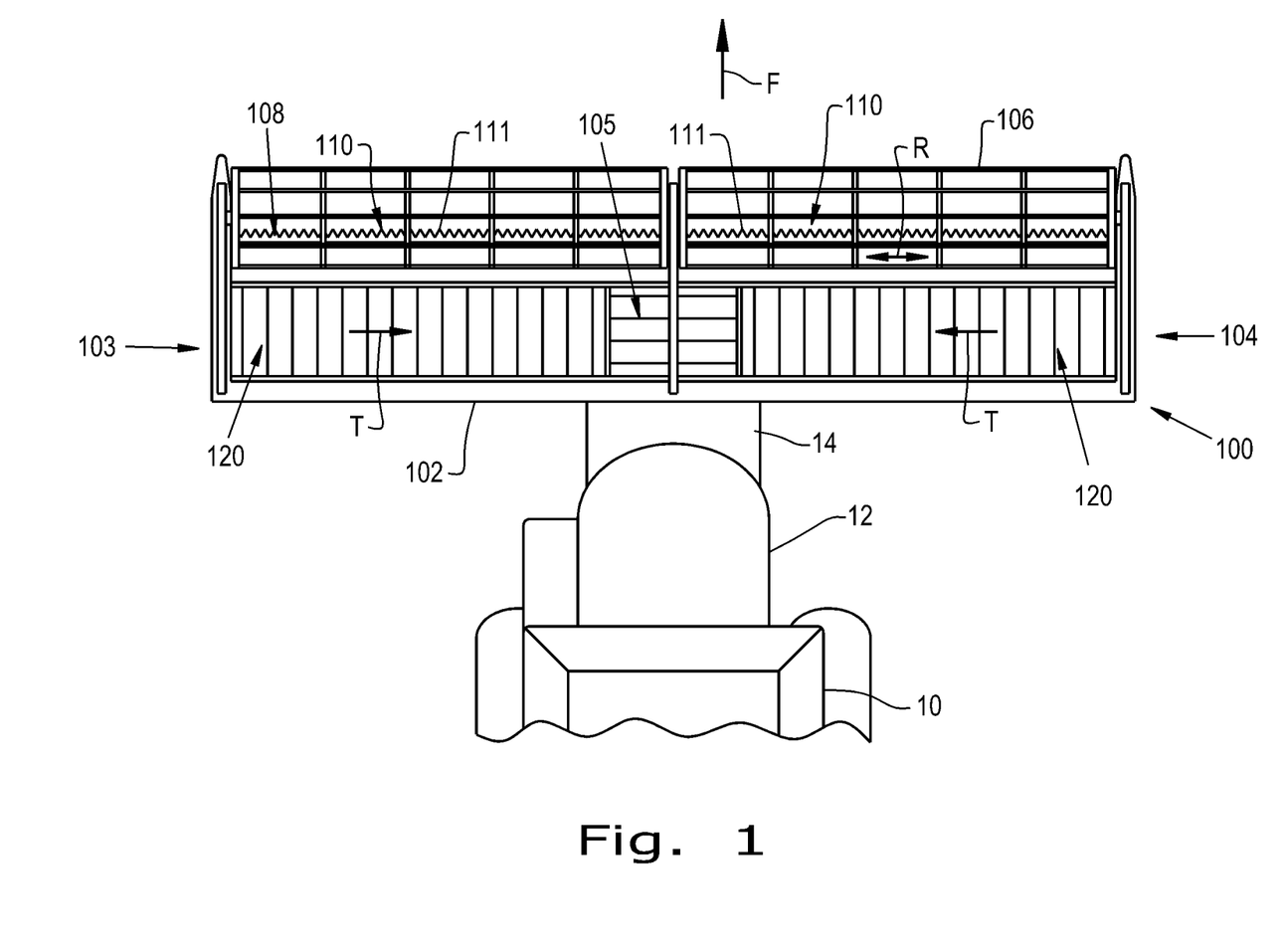
FIG. 1 is a top view of an agricultural vehicle shown in the form of a combine harvester, in accordance with an exemplary embodiment of the present invention.

Referring now to the drawings, and more particularly to FIG. 1, there is shown an exemplary embodiment of an agricultural vehicle 10 in the form of a combine harvester which generally includes a chassis 12, a feeder housing 14, and an attachment in the form of a header 100. Typically, the combine harvester 10 will include additional internal systems for the separation and handling of collected crop material, but these additional systems are omitted from view for brevity of description. It should be appreciated that the header 100 described and illustrated herein does not necessarily need to be included on combine harvesters, but can be incorporated in other agricultural vehicles such as windrowers.

The header 100 is coupled to, and therefore supported by, the chassis 12 of the agricultural vehicle 10 by, for example, coupling to the feeder housing 14. In the exemplary embodiment shown, the header 100 is in the form of a draper header 100 to harvest bushy or fluffy crop material. The draper header 100 has a frame 102 coupled to the chassis 12 by coupling to the feeder housing 14 and a pair of opposed lateral ends 103, 104. The draper header 100 may support one or more flexible cutter bar assemblies 110 with reciprocating knives 111 to cut crop material as the agricultural vehicle 10 travels in a forward direction, denoted by arrow F. The reciprocating knives 111, which may be referred to as cutting elements, can be reciprocated back-and-forth in a lateral direction, denoted by arrow R, relative to the forward direction F in any known manner, e.g., by a wobble box, epicyclic drive, etc. The draper header 100 may further include a center feed belt 105 or a center auger that conveys the crop material into the feeder housing 14. The draper header 100 may also include one or more lateral, flexible draper belts 120 that are positioned rearwardly of the cutter bar assemblies 110 and travel, i.e. rotate, in opposing directions of travel, denoted by each arrow "T", in order to convey the crop material inwardly to the center feed belt 105 and thereby the feeder housing 14. The header 100 may also include a rotating reel 106 with tines or the like to sweep the crop material inwardly. It should be appreciated that while the header 100 described and illustrated herein is shown in the form of a draper header incorporating draper belts 120, in some alternative embodiments the header 100 can incorporate a pair of counter-rotating or co-rotating augers or a single conveying auger.

Figure 2:
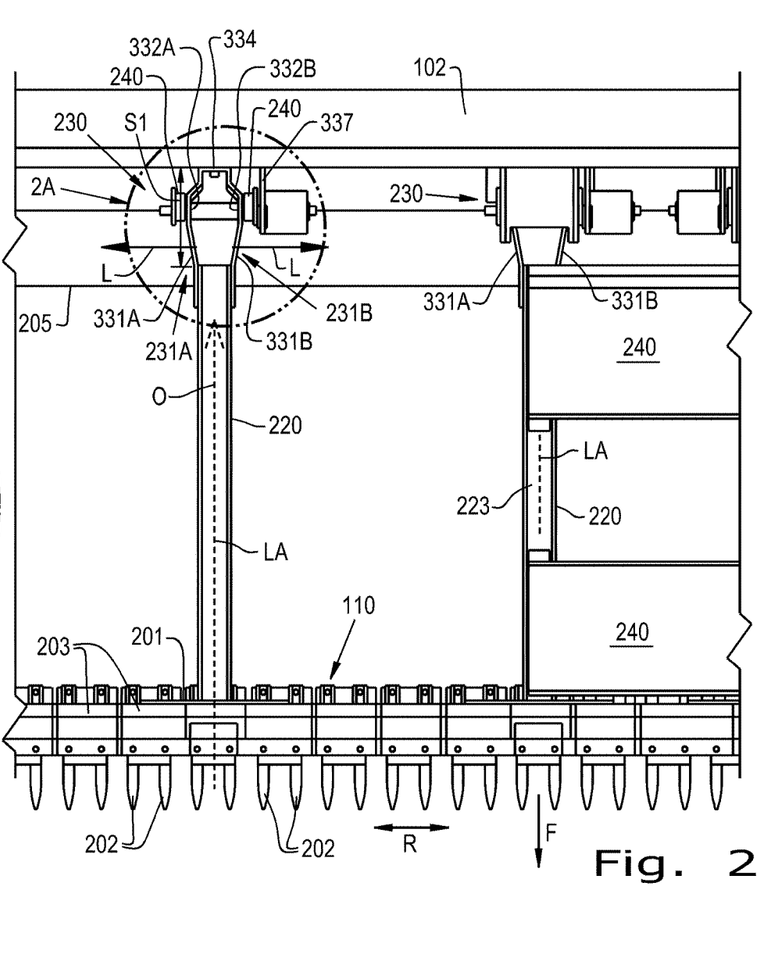
FIG. 2 is a sectional view of a portion of a header shown in FIG. 1 with a draper belt of the header removed.
Figure 2A:
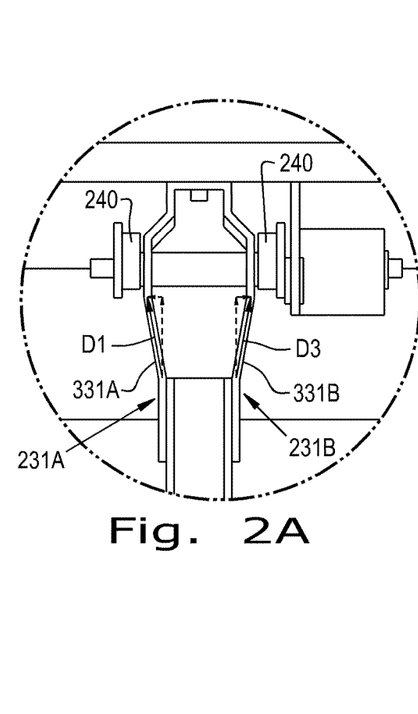
FIG. 2A is an enlargement of a portion of the header shown in FIG. 2.

Referring now to FIGS. 2 and 2A, the exemplary embodiment of the header 100 shown in FIG. 1 is illustrated with the draper belts 120 removed to show certain aspects of an exemplary embodiment of the present invention. As can be seen, the cutter bar assembly 110 can include a relatively rigid cutter bar 201 supporting the cutting elements 111 and which extends perpendicularly to the forward travel direction F, i.e., parallel to the lateral direction R. The cutter bar assembly 110 can also support a plurality of cutting guides 202 that can hold and guide crop material toward the cutting element 111 (not shown in FIG. 2) during harvesting. As is known, a plurality of ramps 203 can also be supported by the cutter bar 201 to direct the cut crop material vertically upward so the cut crop material tends to fall on top of the draper belts 120 during harvesting, rather than falling below the draper belts 120. It should be appreciated that the shown cutter bar assembly 110 is exemplary only, and other types of cutter bar assemblies may be incorporated in a header in accordance with the present invention.

As can be seen, a plurality of linkage arms 220 are connected to the cutter bar assembly 110. As shown, the linkage arms 220 define a linkage axis LA which extends generally parallel to the forward travel direction F, but it should be appreciated that the linkage axis LA, and thus the linkage arms 220, can be angled relative to the forward travel direction F if desired. The linkage arms 220 may, for example, be connected to the cutter bar 201. The linkage arms 220 can be formed of a relatively rigid material, such as steel, and rigidly connected to the cutter bar assembly 110 by, for example, bolting or welding the linkage arms 220 to the cutter bar assembly 110 so forces acting on the cutter bar assembly 110 can transmit through the linkage arms 220, which will be described further herein. The number of linkage arms 220 can be varied, as desired, to provide an adequate amount of support for the cutter bar assembly 110. Similarly, a spacing between adjacent linkage arms 220 can also be varied as desired.

To connect the linkage arms 220 to the frame 102 and thus support the cutter bar assembly 110 during harvesting, a plurality of sacrificial connectors 230 are each connected to a respective one of the linkage arms 220 and the frame 102. The sacrificial connectors 230 may each be, for example, bolted to the frame 102 to connect the linkage arms 220 to the frame 102. The sacrificial connectors 230 may also be supported on the bottom, against gravity, by a support tube 205 extending in the lateral direction R. As should be appreciated from FIG. 2, the linkage arms 220 can also have support surfaces 240 connected to top surfaces 223 of the linkage arms 220 to support a bottom of the draper belts 120 during harvesting.

Figure 3:
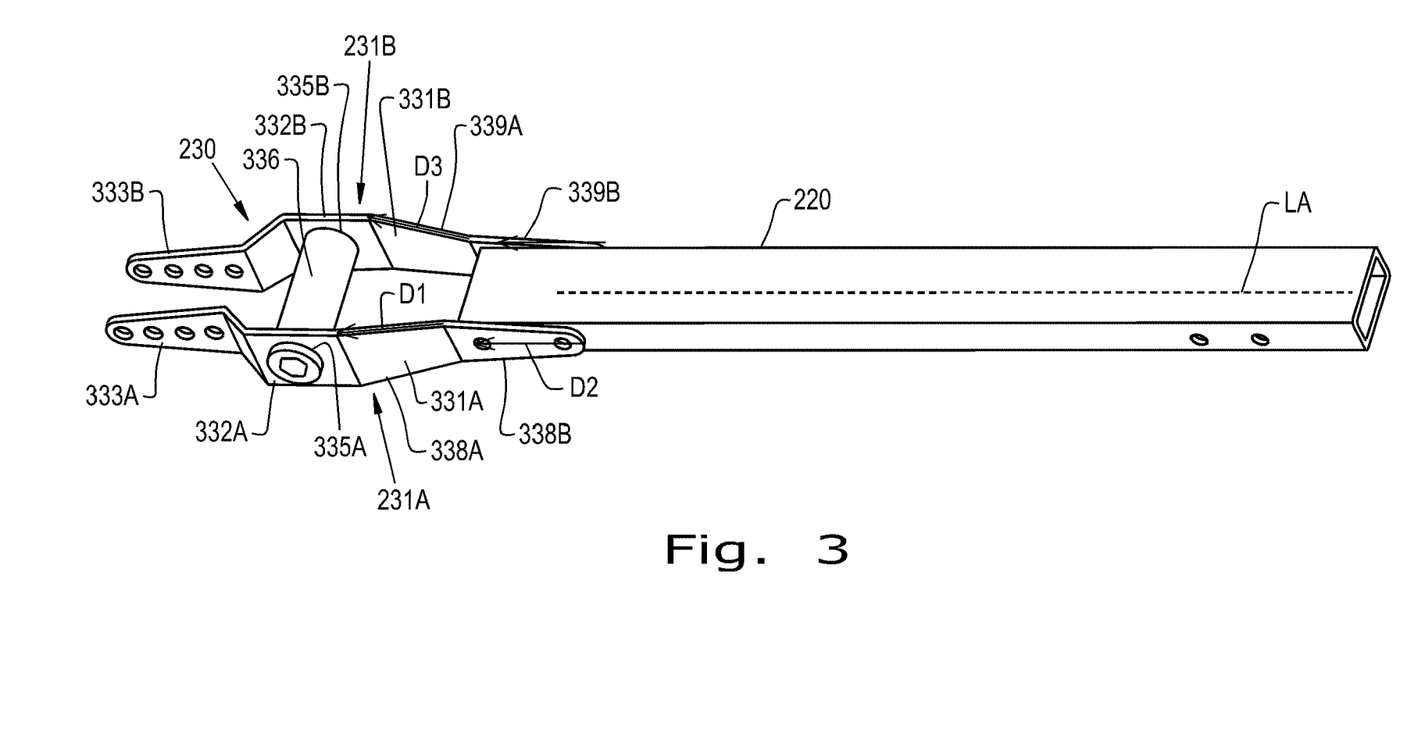
FIG. 3 is a perspective view of one exemplary embodiment of a linkage arm and sacrificial connector of the present invention with a pair of sacrificial regions.
Figure 4:
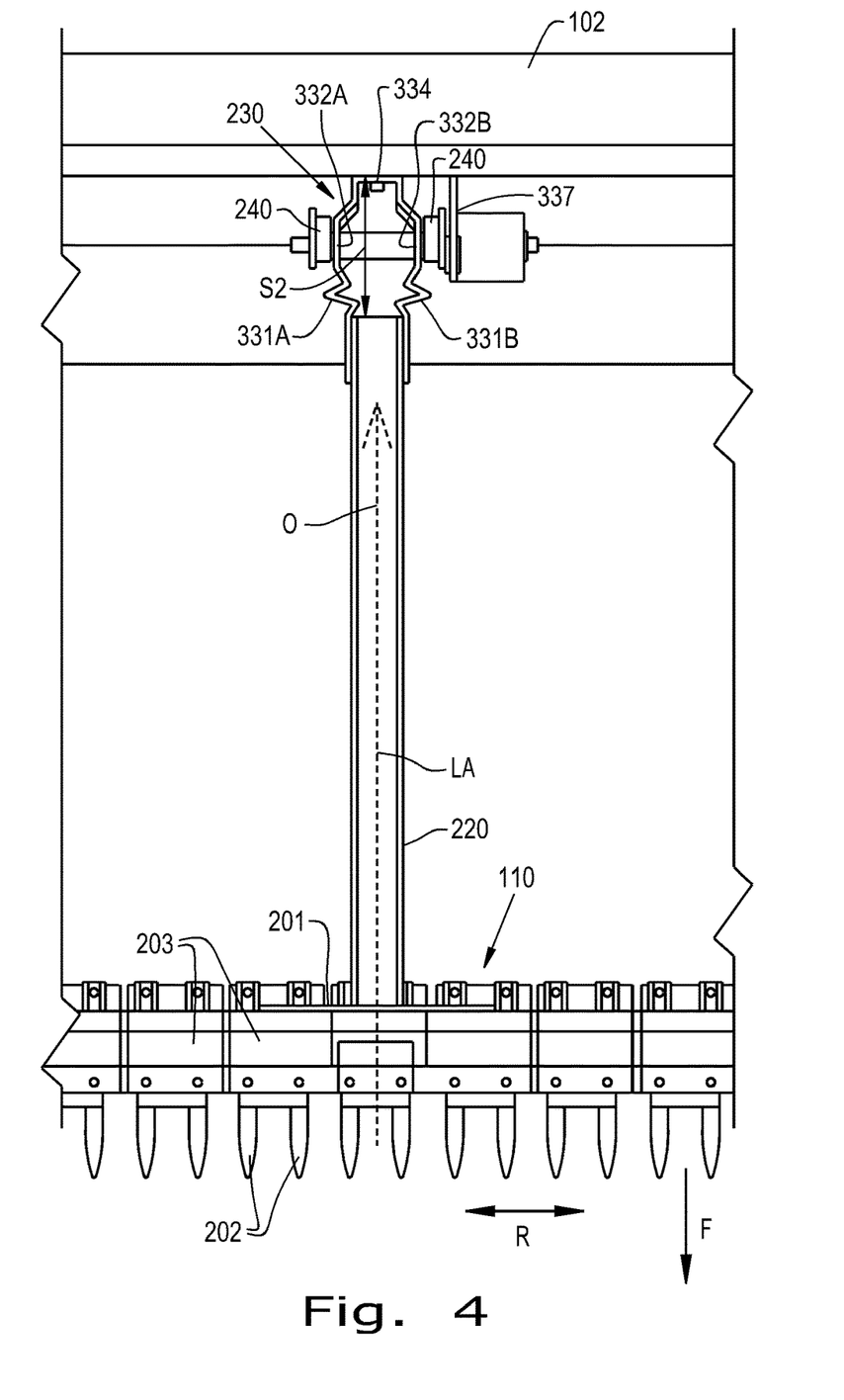
FIG. 4 is another sectional view of the portion of the header shown in FIG. 2 after an exemplary sacrificial connector has deformed.

With further reference to FIGS. 2 and 2A, and also now referring to FIGS. 3-4, each sacrificial connector 230 can include at least one sacrificial region 331A, 331B in each of a respective pair of connecting arms 231A, 231B. The sacrificial regions 331A, 331B of the sacrificial connector 230 can, in one exemplary embodiment, be connected together by one or more bolstered regions 332A, 332B of the sacrificial connector 230. The sacrificial regions 331A, 331B, in some exemplary embodiments, are configured to deform upon an overload force acting on the respectively connected linkage arm 220 and transmitting to the sacrificial connector 230, when such overload force exceeds a first predetermined threshold. The bolstered region(s) 332A, 332B, on the other hand, may be configured to withstand such overload force exceeding the first predetermined threshold and not deform due to bolstering provided by, e.g., support from another element, increased strength from being a thicker or stronger material, etc. In some exemplary embodiments, the bolstered region(s) 332A, 332B may be configured to withstand forces up to a second predetermined threshold which is considerably greater than the first predetermined threshold before deforming; the second predetermined threshold may be, for example, at least 1.5 times greater than the first predetermined threshold. To reduce the risk of damage to the linkage arms 220 during a collision, the previously described first predetermined threshold and second predetermined threshold of forces can both be less than a third predetermined threshold of a force necessary to deform the linkage arm(s) 220. As opposed to a spring which will generally compress or stretch upon any compressive or tensile force acting upon the coils of the spring in the compression axis, the sacrificial regions 331A, 331B are configured to remain substantially rigid, i.e., generally non-compressible and non-stretchable, until an overload force, denoted by arrow O in FIG. 2 and shown as a compressive force, sufficient to bend or otherwise deform the material of the sacrificial region(s) 331A, 331B acts on the connected linkage arm 220 and transmits to the sacrificial region(s) 331A, 331B. The sacrificial region(s) 331A, 331B may, for example, be configured to deform laterally outwardly, as denoted by arrows L in FIG. 2, in a direction perpendicular to the linkage axis LA upon the overload compressive force O acting on the connected linkage arm 220, resulting in the deformed sacrificial regions 331A, 331B shown in FIG. 4.

By having the sacrificial region(s) 331A, 331B be substantially rigid until the overload force F acts on the linkage arm 220, the sacrificial connectors 230 can support the connected linkage arms 220, and thus the cutter bar assembly 110, until a large overload force which exceeds the first predetermined threshold, which overload force may result from a collision between the cutter bar assembly 110 and an immobile object, acts on the connected linkage arm(s) 220 and transmits to the sacrificial region(s) 331A, 331B to deform the sacrificial region(s) 331A, 331B rather than the linkage arm(s) 220 and/or the frame 102 of the header 100. In this sense, the sacrificial connectors 230 can be configured to have a non-deformed state in order to help support the cutter bar assembly 110 during harvesting while also being a weak point in the structure of the header 100 that will deform upon the overload force O transmitting to the sacrificial region(s) 331A, 331B through the linkage arm(s) 220, which can limit damage to the relatively easily replaceable sacrificial connector 230 while likely sparing the cutter bar assembly 110 and frame 102 from significant damage and keeping the connection between the linkage arm(s) 220 and the frame 102 intact. The sacrificial region(s) 331A, 331B may, for example, be formed of a relatively thin and/or flimsy material so the sacrificial region(s) 331A, 331B will tend to be easily deformed once the overload force O acts on the linkage arm 220.

As can be seen in FIGS. 2-4, the sacrificial connector 230 can have a pair of sacrificial regions including a first sacrificial region 331A and a second sacrificial region 331B which define a space therebetween, with each sacrificial region 331A, 331B connecting to the linkage arm 220 within, the linkage arm 220 at least partially filling the space 332. Each sacrificial region 331A, 331B can be, for example, bolted to the linkage arm 220 and tabs 333A, 333B of the sacrificial connector 230 can be bolted to the frame 102 so the sacrificial connector 230 can be easily replaced by unbolting the respective bolts 334. It should be appreciated that the tabs 333A, 333B shown in FIG. 3 can be bent to overlap with another before being bolted to the frame 102, as shown in FIG. 2. It should be further appreciated that while the sacrificial regions 331A, 331B are shown as being bolted to the linkage arm 220 and the sacrificial connector 230 is shown bolted to the frame 102, the sacrificial regions 331A, 331B can be connected to the linkage arms 220 and the sacrificial connector 230 can be connected to the frame 102 in any suitable manner, such as by welding, gluing, riveting, etc. The sacrificial regions 331A, 331B can also each have an opening 335A, 335B formed therein with a joining rod 336 placed in the openings 335A, 335B and connected to a mount 337 which is connected to the frame 102. To bolster the bolstered region(s) 332A, 332B, a pair of bolstering caps 240 may connect to the joining rod 336 so the bolstered region(s) 332A, 332B of the sacrificial connector 230 is held between the bolstering caps 240 and lateral deformation of the bolstered region(s) 332A, 332B may be constrained within the bolstering caps 240.

The first sacrificial region 331A can include a first portion 338A which extends in a first direction D1 and a second portion 338B which extends in a second direction D2 and is connected to the linkage arm 220. As shown, the second direction D2 can be generally parallel to the linkage axis LA of the linkage arm 220. Similarly, the second sacrificial region 331B can include a third portion 339A which extends in a third direction D3 oppositely to the first direction D1 of the first portion 338A and a fourth portion 339B which extends in a fourth direction D4 generally parallel to the second direction D2 of the second portion 338B, i.e., the fourth portion 339B extends generally parallel to the second portion 338B and the linkage axis LA. The previously described bolstered regions 332A, 332B may also extend generally parallel to the linkage axis LA. In one exemplary embodiment, the sacrificial regions 331A, 331B are angled relative to the linkage axis LA so that they will deform, laterally or otherwise, when the compressive forces exceed a first predetermined threshold. The portions 332A, 332B, 338B, 339B, on the other hand, can be parallel to the longitudinal axis LA and bolstered to withstand substantially higher compressive forces, such that they will appreciably deform when the compressive forces exceed the second predetermined threshold greater than the first predetermined threshold, as previously described.

As the first portion 338A and the third portion 339A extend in respective directions D1, D3 having both parallel and transverse vectors relative to the linkage axis LA, which are illustrated as dashed lines in FIG. 2A, force transmitted into the first portion 338A and/or third portion 339A from the linkage arm 220 will be converted into both compressive forces, which will be transmitted toward the frame 102, and lateral deformation forces that will tend to deform the sacrificial regions 331A, 331B, which are not laterally supported. As can be seen in comparing FIGS. 2 and 4, the lateral deformation forces in combination with the compressive forces will tend to deform the sacrificial connectors 230 from the non-deformed state shown in FIG. 2 to a deformed state in FIG. 4. The linkage arms 220 can define a distance from the frame 102 that corresponds to the state of the sacrificial connectors 230. As shown in FIG. 2, the linkage arms 220 define a first distance S1 from the frame 102 when the sacrificial connectors 230 are in the non-deformed state, representing a normal operating state. When the sacrificial connector(s) 230 deforms due to the overload force O acting upon the linkage arm(s) 220, as shown in FIG. 4, the sacrificial regions 331A, 331B can spread perpendicularly relative to the linkage axis LA so the linkage arm(s) 220 is a second distance S2 from the frame 102 which is less than the first distance S1 when the sacrificial connector(s) 230 is in the non-deformed state. In this sense, the sacrificial connector(s) 230 can be configured to shorten in the direction of the linkage axis LA upon the overload force O acting upon the linkage arm(s) 220 so the header 100 can tend to "crumple" at the sacrificial connectors 230 when impacting a relatively immobile object, severely damaging, if not destroying, the sacrificial connectors 230 for the sake of saving and/or limiting damage to the cutter bar assembly 110 and/or frame 102. While the distances S1, S2 of the linkage arm 220 relative to the frame 102 are shown as changing from a larger, non-deformed distance S1 to a smaller, deformed distance S2 to crumple, it is contemplated that the sacrificial connectors 230 can be configured to change from a smaller, non-deformed distance to a larger, deformed distance upon deforming to an overload force acting upon the linkage arm(s) 220.

Figure 5:
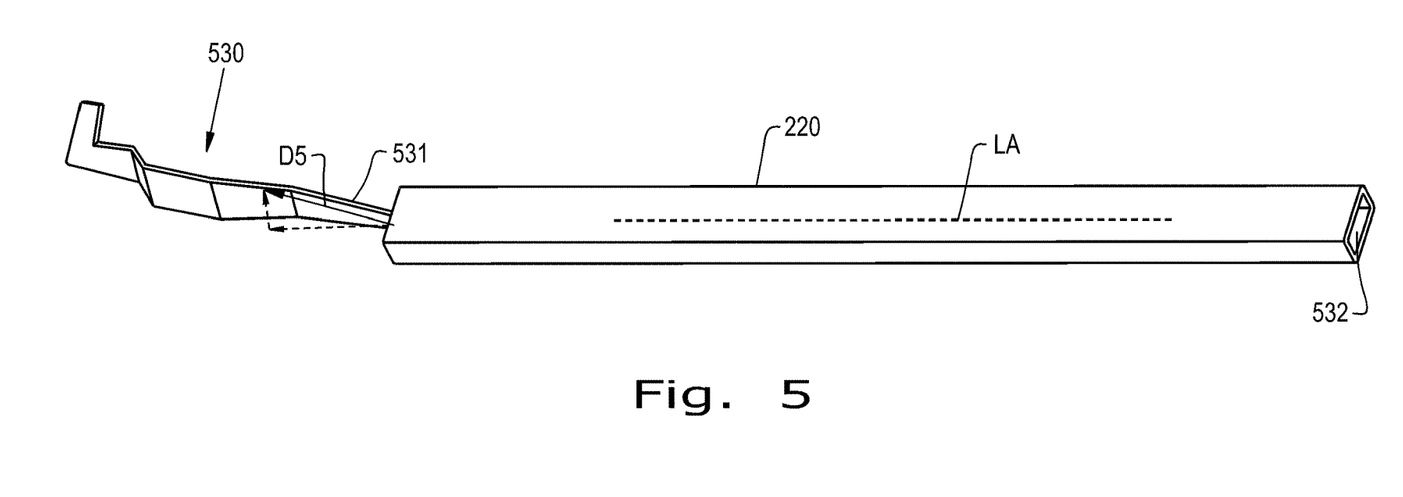
FIG. 5 is a perspective view of another exemplary embodiment of a linkage arm and sacrificial connector of the present invention with a single sacrificial region.

Referring now to FIG. 5, an alternative exemplary embodiment of a sacrificial connector 530 connected to one of the linkage arms 220 is shown. As can be seen, the sacrificial connector 530 only has one sacrificial region 531 which is connected to the linkage arm 220 and is configured to deform upon an overload force acting on the linkage arm 220. The sacrificial region 531 may be connected to the linkage arm 220, for example, by placing a portion (not shown) of the sacrificial region 531 within an interior 532 of the linkage arm 220 and welding the sacrificial region 531 to the linkage arm 220. The sacrificial region 531 extends in a fifth direction D5 which has both parallel and transverse vectors, illustrated as dashed lines, relative to the linkage axis LA so the overload force transmitted into the sacrificial region 531 from the linkage arm 220 will tend to crumple the sacrificial region 531 in a similar manner to the previously described sacrificial regions 331A, 331B. In all other respects, the single sacrificial region 531 can be configured similarly to either of the previously described sacrificial regions 331A, 331B. It should thus be appreciated from the foregoing that sacrificial connectors formed in accordance with the present invention can be formed to have one or more sacrificial regions configured to deform upon an overload force acting on a respectively connected linkage arm.

Figure 6:
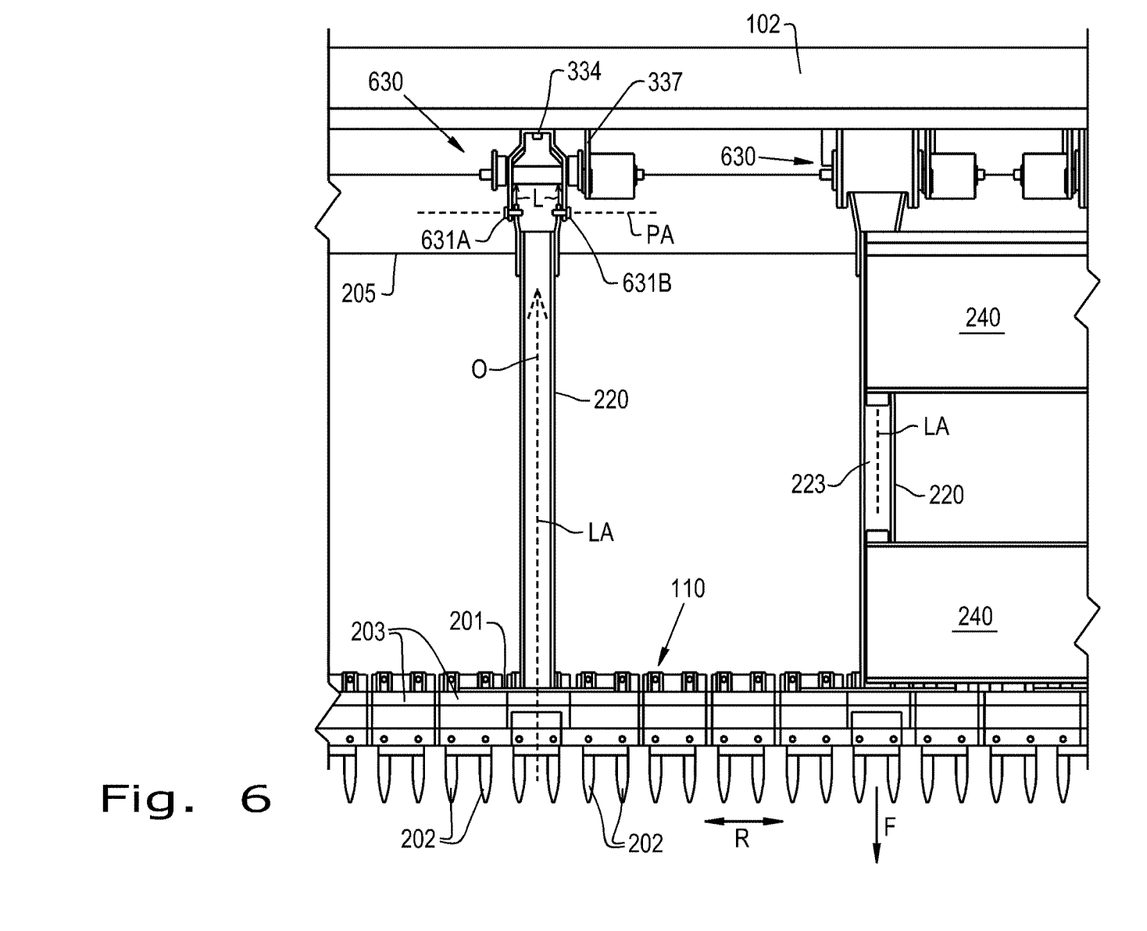
FIG. 6 is a sectional view of a portion of a header shown in FIG. 1 with another exemplary embodiment of a sacrificial connector formed in accordance with the present invention.
Figure 7:
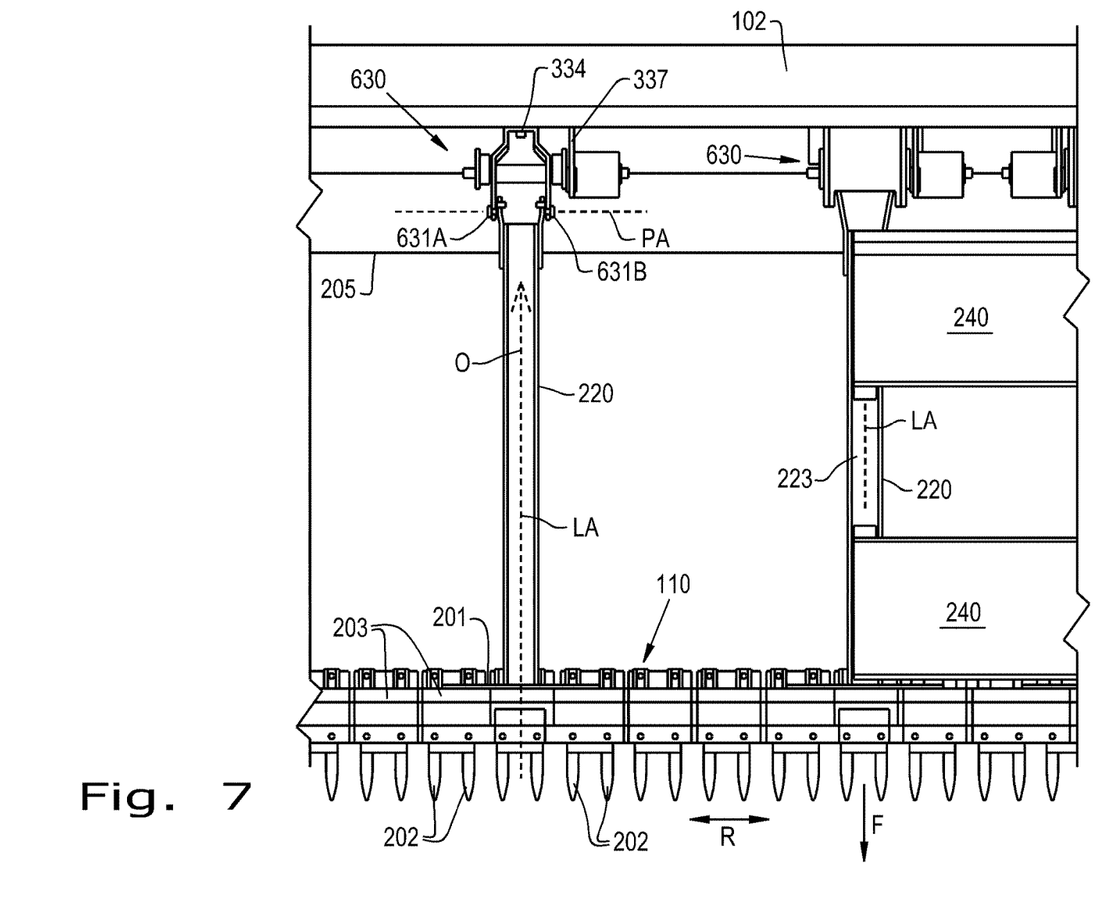
FIG. 7 is a sectional view of the portion of the header shown in FIG. 6 after an exemplary sacrificial region has shattered.

In another exemplary embodiment, and referring now to FIGS. 6-7, the header 100 can include a sacrificial connector 630 connecting the linkage arm 220 to the frame 102. The sacrificial connector 630 is similar to the previously described sacrificial connector 230 in that the sacrificial connector 630 can include one or more sacrificial regions 631A, 631B, but unlike the previously described sacrificial regions 331A, 331B of the sacrificial connector 230, the sacrificial regions 631A, 631B of the sacrificial connector 630 are configured to shatter, rather than deform, upon an overload force O acting on the linkage arm 220. As used herein, the sacrificial region(s) 631A, 631B are "configured to shatter upon an overload force O acting on the linkage arm 220" in the sense that the sacrificial region(s) 631A, 631B will tend to remain substantially rigid until the overload force O acts on the linkage arm 220, at which point the sacrificial region(s) 631A, 631B will fracture with minimal appreciable deformation, such as bending, prior to fracturing. To promote shattering, the sacrificial region(s) 631A, 631B can be formed of relatively brittle materials that will tend to shatter when the overload force O is transmitted into the sacrificial region(s) 631A, 631B from the linkage arm 220. For example, the sacrificial region(s) 631A, 631B can comprise a shear pin, which is shown as a bolt, or similar construction which is relatively stable to compressing forces acting along a pin axis PA of the shear pin 631A, 631B, while being relatively susceptible to shattering due to shear forces, shown as arrows L in FIG. 6, which act perpendicularly to the pin axis PA. Once the shear forces, which can be vector forces from the overload force O, acting on the sacrificial region(s) 631A, 631B are sufficiently high, the sacrificial region(s) 631A, 631B can shatter and disconnect the linkage arm 220 from the frame 102, as shown in FIG. 7, to absorb some of the overload force O and limit and/or prevent structural damage to the frame 102 and/or cutter bar assembly 110. While the shear pins 631A and 631B are shown in the embodiment of bolts, other types of shear pins can be used such as rivets, glue joints, plastic connectors, etc. In all other respects, the sacrificial connector 630 can be configured similarly to the sacrificial connector 230.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural vehicle, comprising:
   a chassis; and
   a header carried by said chassis, said header including:
      a frame coupled to said chassis;
      a cutter bar assembly connected to said frame;
      a plurality of linkage arms connected to said cutter bar assembly and said frame; and
      a plurality of sacrificial connectors each connecting a respective one of said linkage arms to said frame, each of said plurality of sacrificial connectors including at least one sacrificial region configured to one of deform and shatter upon an overload force acting on said respectively connected linkage arm.

2. The agricultural vehicle according to claim 1, wherein each of said linkage arms defines a linkage axis, each of said at least one sacrificial regions being configured to deform in a direction perpendicular to said linkage axis of said respectively connected linkage arm upon said overload force acting on said respectively connected linkage arm.

3. The agricultural vehicle according to claim 1, wherein each of said sacrificial connectors defines a non-deformed state and each of said respectively connected linkage arms defines a distance from said frame when said respectively connected sacrificial connector is in said non-deformed state, each of said sacrificial connectors being configured such that said distance from said frame changes upon said sacrificial region deforming due to said overload force acting on said respectively connected linkage arm.

4. The agricultural vehicle according to claim 1, where at least one of said sacrificial connectors includes a pair of sacrificial regions.

5. The agricultural vehicle according to claim 4, wherein said pair of sacrificial regions includes a first sacrificial region connected to said respectively connected linkage arm and a second sacrificial region connected to said respectively connected linkage arm.

6. The agricultural vehicle according to claim 5, wherein said first sacrificial region and said second sacrificial region define a space therebetween, said respectively connected linkage arm at least partially filling said space.

7. The agricultural vehicle according to claim 6, wherein said first sacrificial region includes a first portion extending in a first direction and a second portion connected to said respectively connected linkage arm, said second sacrificial region including a third portion extending in a third direction oppositely to said first direction and a fourth portion extending generally parallel to said second portion and connected to said respectively connected linkage arm.

8. The agricultural vehicle according to claim 5, wherein said first sacrificial region and said second sacrificial region are each bolted to said respectively connected linkage arm.

9. The agricultural vehicle according to claim 1, wherein said at least one sacrificial region comprises a shear pin.

10. The agricultural vehicle according to claim 1, wherein each of said linkage arms defines a linkage axis and each of said sacrificial connectors is configured to shorten in a direction of said linkage axis upon said overload force acting upon the respectively connected linkage arm.

11. A header for an agricultural vehicle, comprising:
a frame;
a cutter bar assembly connected to said frame;
a plurality of linkage arms connected to said cutter bar assembly and said frame; and
a plurality of sacrificial connectors each connecting a respective one of said linkage arms to said frame, each of said plurality of sacrificial connectors including at least one sacrificial region configured to one of deform and shatter upon an overload force acting on said respectively connected linkage arm.

12. The header according to claim 11, wherein each of said linkage arms defines a linkage axis, each of said at least one sacrificial regions being configured to deform in a direction perpendicular to said linkage axis of said respectively connected linkage arm upon said overload force acting on said respectively connected linkage arm.

13. The header according to claim 11, wherein each of said sacrificial connectors defines a non-deformed state and each of said respectively connected linkage arms defines a distance from said frame when said respectively connected sacrificial connector is in said non-deformed state, each of said sacrificial connectors being configured such that said distance from said frame changes upon said sacrificial region deforming due to said overload force acting on said respectively connected linkage arm.

14. The header according to claim 11, where at least one of said sacrificial connectors includes a pair of sacrificial regions.

15. The header according to claim 14, wherein said pair of sacrificial regions includes a first sacrificial region connected to said respectively connected linkage arm and a second sacrificial region connected to said respectively connected linkage arm.

16. The header according to claim 15, wherein said first sacrificial region and said second sacrificial region define a space therebetween, said respectively connected linkage arm at least partially filling said space.

17. The header according to claim 16, wherein said first sacrificial region includes a first portion extending in a first direction and a second portion connected to said respectively connected linkage arm, said second sacrificial region including a third portion extending in a third direction oppositely to said first direction and a fourth portion extending generally parallel to said second portion and connected to said respectively connected linkage arm.

18. The header according to claim 15, wherein said first sacrificial region and said second sacrificial region are each bolted to said respectively connected linkage arm.

19. The header according to claim 11, wherein said at least one sacrificial region comprises a shear pin.

20. The header according to claim 11, wherein each of said linkage arms defines a linkage axis and each of said sacrificial connectors is configured to shorten in a direction of said linkage axis upon said overload force acting upon the respectively connected linkage arm.

* * * * *